(12) United States Patent
Noji

(10) Patent No.: US 6,276,418 B1
(45) Date of Patent: Aug. 21, 2001

(54) PNEUMATIC RADIAL TIRE WITH TURNED DOWN CARCASS LAYER

(75) Inventor: Hikomitsu Noji, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 09/452,810

(22) Filed: Dec. 2, 1999

(30) Foreign Application Priority Data

Dec. 11, 1998 (JP) .................................................. 10-353205

(51) Int. Cl.⁷ .............................. B60C 15/00; B60C 15/06
(52) U.S. Cl. .......................... 152/543; 152/553; 152/554; 152/555
(58) Field of Search ..................................... 152/553, 554, 152/555, 543

(56) References Cited

U.S. PATENT DOCUMENTS 4,024,901 * 5/1977 Poque ................................. 152/553 X

* cited by examiner

Primary Examiner—Adrienne C. Johnstone
(74) Attorney, Agent, or Firm—Arent Fox Kintner Plotkin & Kahn, PLLC

(57) ABSTRACT

A pneumatic radial tire having carcass layers of three plies each constituted by organic fiber cords and in which both end portions of a first one and a second one of the carcass layers enumerated from an inner side to an outer side direction of the tire in the 3 plies of carcass layers, are folded back from the inner side to the outer side of the tire respectively around bead cores, reinforcement layers are arranged on outer sides of the fold back portions of the carcass layers and a third one of the carcass layers is turned down to cover outer sides of the reinforcement layers.

4 Claims, 2 Drawing Sheets ium radial tire having
driving stability and load durability applicable to a high
performance passenger vehicle.

[0002] Conventionally, as a radial tire for a high performance passenger vehicle, for example, a pneumatic radial tire has been known in which the carcass layers are a two-layer structure as shown by FIG. 2. According to the tire shown by FIG. 2, two carcass layers 28 and 30 are arranged to reach a bead portion 26 from a tread portion 22 via a side portion 24. Whereas both end portions of the carcass layer 28 on an inner side are respectively folded back from an inner side of the tire to an outer side of a tire to wrap the bead fillers 34 around left and right bead cores 32, both end portions of the carcass layer 30 on an outer side are turned down to vicinities of bead toes via inner diameter sides of the bead cores 32 to cover outer sides of fold back portions 28b of the carcass layer 28. Further, reinforcement layers 36 comprising steel cords are arranged between the carcass layer 30 on the outer side and fold back portions 28b of the carcass layer 28 on the inner side. Further, two belt layers 38 are arranged on an outer side of the carcass layer 30 on the outer side at the tread portion 22.

[0003] In viewing passenger vehicles on sale in recent years, a vehicle having a power output of 280 horsepower and a mass of 1.5 tons has become more common than a vehicle having a displacement of 2000 cc. In the case of the conventional tire structure shown by FIG. 2, it is difficult to ensure driving stability and load durability for such a vehicle. However, when widths of reinforcement layers of a tire are uselessly widened or a number of the layers is increased, a problem can occur in which not only is there an increase in the tire mass but also the load durability deteriorates.

SUMMARY OF THE INVENTION

[0004] It is an object of the invention to provide a pneumatic radial tire capable of promoting driving stability and load durability applicable to a high performance passenger vehicle without substantially giving rise to an increase in the mass of the tire.

[0005] In order to achieve the above-described object, according to an aspect of the invention, there is provided a pneumatic radial tire comprising three plies of carcass layers in which the respective plies comprise organic fiber cords and cord angles of the respective plies relative to a peripheral direction of the tire fall in a range of 65 degrees through 90 degrees, wherein both end portions of a first one and a second one of the carcass layers enumerated from an inner side to an outer side direction of the tire in the three plies of the carcass layers, are folded back from the inner side to the outer side of the tire respectively around bead cores, reinforcement layers are arranged on outer sides of fold back portions of the carcass layers and a third one of the carcass layers is turned down to cover outer sides of the reinforcement layers.

[0006] According to the invention, as mentioned above, three plies of the carcass layer comprising organic fiber cords are provided, the first and the second carcass layers are folded back from the inner side to the outer side of the tire around the bead cores, the reinforcement layers are arranged on the outer sides of the fold back portions, the third carcass layer is turned down on the outer sides of the reinforcement layers. Accordingly, even when a total denier of the organic fiber cords of a total of the carcass layers is made equivalent to that of a conventional pneumatic radial tire for a high performance passenger vehicle using two layers of carcass layers, promotion of higher driving stability and load durability can be achieved. Accordingly, the driving stability and the load durability applicable to a high performance passenger vehicle, such as those on sale in recent years can be achieved.

[0007] In this case, "turning down the third carcass layer to cover the outer side of the reinforcement layer" means that the third carcass layer is arranged to hang down to reach the vicinities of the bead toes from the outer sides of the reinforcement layers via the inner diameter sides of the bead cores.

BRIEF DESCRIPTION OF THE DRAWINGS

[0008]

[0009]

DESCRIPTION OF THE PREFERRED EMBODIMENTS

Figure 1:
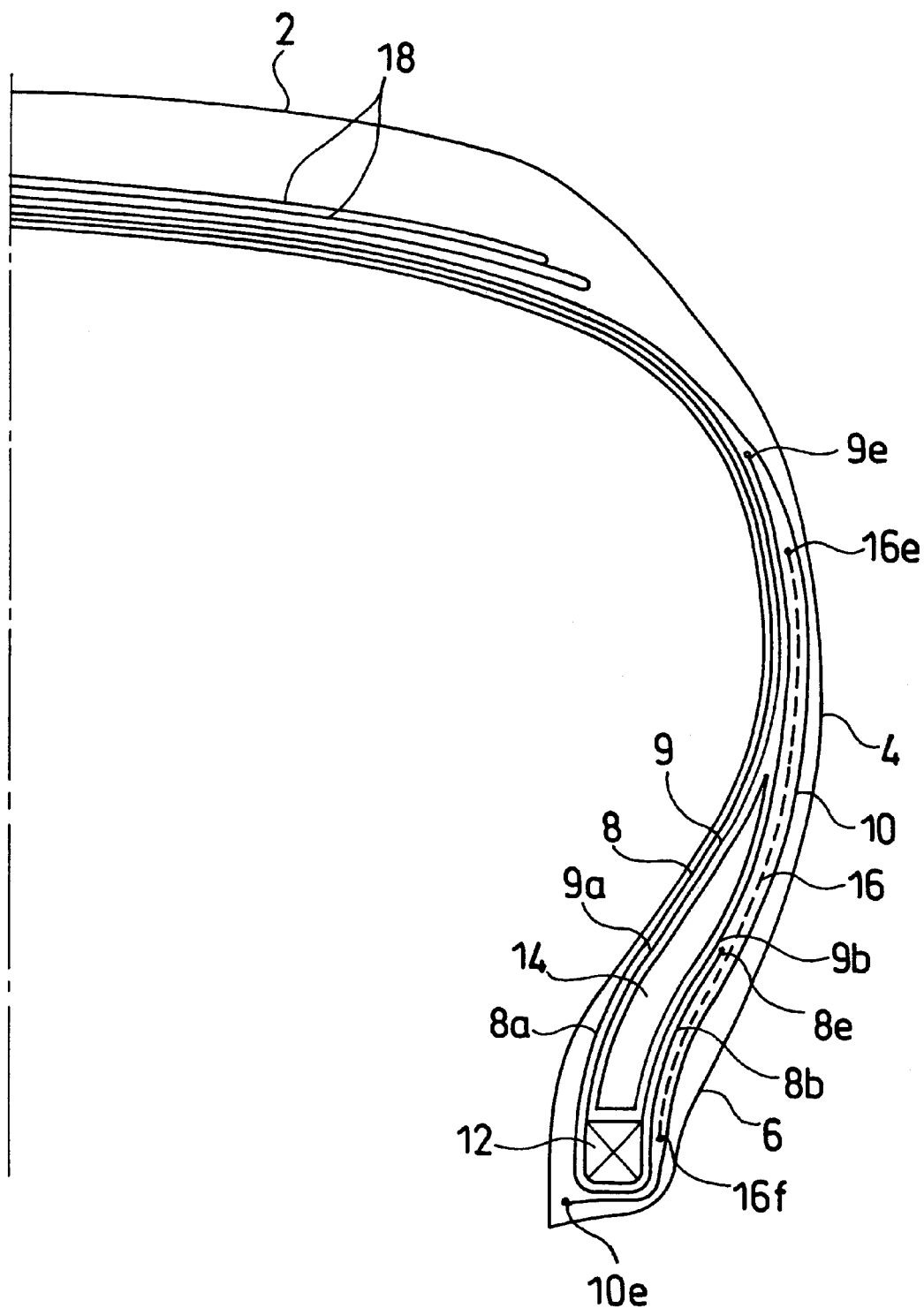
FIG. 1 is a semi-sectional view in a meridian direction showing an embodiment of a pneumatic radial tire according to the invention.

[0010] According to a pneumatic radial tire of the invention shown by FIG. 1, three plies of carcass layers 8, 9 and 10 are provided having a carcass cord which comprises a polyester cord of 1000D/2 and has a cord angle relative to the peripheral direction of the tire in a range of 65 degrees through 90 degrees. According to these carcass layers 8, 9 and 10, when the cord angle is less than 90 degrees, the carcass cords intersect with each other between the plies.

[0011] Further, the carcass layers 8, 9 and 10 are arranged to reach bead portions 6 from a tread portion 2 via side portions 4. Both end portions of a first carcass layer 8 and a second carcass layers 9 (which are enumerated from an inner side to an outer side direction of the tire) are folded back from the inner side to the outer side of the tire to wrap the bead fillers 14, respectively, around left and right bead cores 12. A reinforcement layer 16 is arranged on the outer sides of the fold back portions 8b and 9b of the first and the second carcass layers 8 and 9. The third carcass layer 10 is turned down to cover an outer side of the reinforcement layer 16.

[0012] The fold back portion 9b of the second carcass layer 9 is made longer than the fold back portion 8b of the first carcass layer 8. A distal end portion 9e of the fold back portion 9b is extended to a position on a side of the tread higher than a height of a maximum sectional width portion of the tire (that is, a maximum sectional width position of the tire). In contrast thereto, a distal end portion 8e of the fold back portion 8b of the first carcass layer 8 does not reach the height of the maximum sectional width portion of the tire and is arranged on a bead portion side of the position.

[0013] By arranging the fold back portion 9b and the fold back portion Bb in this way, a laminated layer region in which the fold back portion 9b of the second carcass layer 9 is directly laminated on an outer side of a portion of the carcass layer 9 which is not folded back (that is, main body portion) 9a, is widened. Consequently, when the cord angle of the second carcass layer 9 relative to the peripheral direction of the tire is less than 90 degrees, the flexural rigidity produced by intersecting the carcass cords with each other between the plies in the laminated region is increased. In this manner, the driving stability can further be enhanced. Notation 8a designates a portion of the first carcass layer 8 which is not folded back, that is, a main body portion thereof.

[0014] The reinforcement layers 16 comprising steel cords are arranged on the outer sides of the fold back portions 8b and 9b of the first and the second carcass layers 8 and 9. According to the reinforcement layer 16, a tread side distal end portion 16e is disposed on the tread side between the tread and the maximum sectional width position of the tire and a bead portion side distal end portion 16f is disposed on the bead portion side. The reinforcement layer 16 is arranged to cover the distal end portion 8e of the fold back portion 8b of the first carcass layer 8. The bead portion side distal end portion 16f is extended to reach an outer side of the bead core 12.

[0015] Further, both end portions of the third carcass layer 10 are turned down to cover outer sides of the reinforcement layers 16. The distal end portions be are extended from inner peripheral sides of the bead cores 12 to the vicinities of the bead toes.

[0016] The tread portion 2 is laminated with two tread layers 18 comprising steel cords such that the cords intersect each other between the plies on an outer side of the third carcass layer 10.

[0017] According to the pneumatic radial tire of the invention comprising the above-described constitution, when any of three plies of the carcass layers 8, 9 and 10 is constituted by, for example, organic fiber cords of 1000D/2, although the number of plies is more than that of the conventional radial tire for a vehicle having high power output (a two-layer structure of organic fiber cords substantially of 1500D/2), a total fiber size of the carcass layers as a whole becomes substantially the same as that of the carcass layers of the conventional radial tire. Consequently, the tire mass is not substantially increased. Further, by using such carcass layers 8, 9 and 10, both end portions of the first and the second carcass layers 8 and 9 are turned up from the inner side to the outer side of the tire around the bead cores 12, the reinforcement layers 16 are arranged on the outer sides of the fold back portions 8b and 9b, the third carcass layers 14 are turned down and arranged to cover the reinforcement layers 16 further on the outer sides. Accordingly, an improvement in the driving stability and load durability can be achieved. Therefore, according to the invention, a pneumatic radial tire is provided having the driving stability and the load durability applicable to the type of a passenger vehicle having high power output, high function and high load which has been on sale in recent years.

[0018] According to the pneumatic radial tire of the invention, cords of organic fibers of nylon, polyester, rayon or aramid fibers can be used as the carcass cords. These have been used conventionally. Polyester fiber cords are particularly preferable. Further, the number of implanting cords (number of ends) is preferably set to 45 through 55 pieces/50 mm at the tire equator.

[0019] The cord angle of the respective carcass layer is 65 degrees to 90 degrees relative to the peripheral direction of the tire. When the cord angle is less than 90 degrees, it is preferable to laminate the cords to intersect each other between the respective carcass layers. In this case, as in the example of FIG. 1, it is preferable to make the fold back portion 9b of the second carcass layer 9 longer than the fold back portion 8b of the first carcass layer 8. In this manner, the laminated layer region in which the main body portion 9a and the fold back portion 9b are directly laminated with each other and the carcass cords are intersected with each other between the plies is widened. Consequently, the rigidity of the side of the tire is promoted and accordingly, the driving stability and load durability can further be promoted.

[0020] Further, any of reinforcement cords which have been conventionally used in a pneumatic radial tire for a passenger vehicle having high power output and high function can be used as reinforcement cords of the reinforcement layer. More particularly, steel cords or aramid fiber cords are preferable.

EXAMPLE

[0021] A tire according to the invention and a conventional tire are constructed having a common constitution in which the tire size is 205/50 R16, the carcass layers comprise polyester fiber cords, a cord angle of the carcass layers relative to the peripheral direction of the tire is 90 degrees and the number of implanting cords is 51/50 mm. In each tire structure, the number of plies of the carcass layers and cord fiber size are made to differ as shown by Table 1.

[0022] When the driving stability and JIS load durability have been measured under the above-described conditions in respect of the two kinds of tire, the results of Table 1 are obtained.

Driving Stability:

[0023] Five professional test drivers run vehicles on a slalom test course arranged with pylons at constant intervals and the driving stability is measured by the amount of time to travel the course. An evaluation is carried out by average values of inverse numbers of the time periods of the five test drivers and designated by indices with an inverse number of an average value of a time period of the conventional tire being set as 100. The larger the index value, the more excellent the driving stability is.

JIS Load Durability:

[0024] Using a drum tester having a drum diameter of 1707 mm, the load durability test prescribed by JIS D-4230 JATMA is performed. The load is continuously increased at every 5 hours by 20%. The load when the tire is broken is measured. An evaluation is designated by indices with a measured value of the conventional tire being set as 100. The larger the index value, the more excellent the load durability is.

TABLE 1

Figure 2:
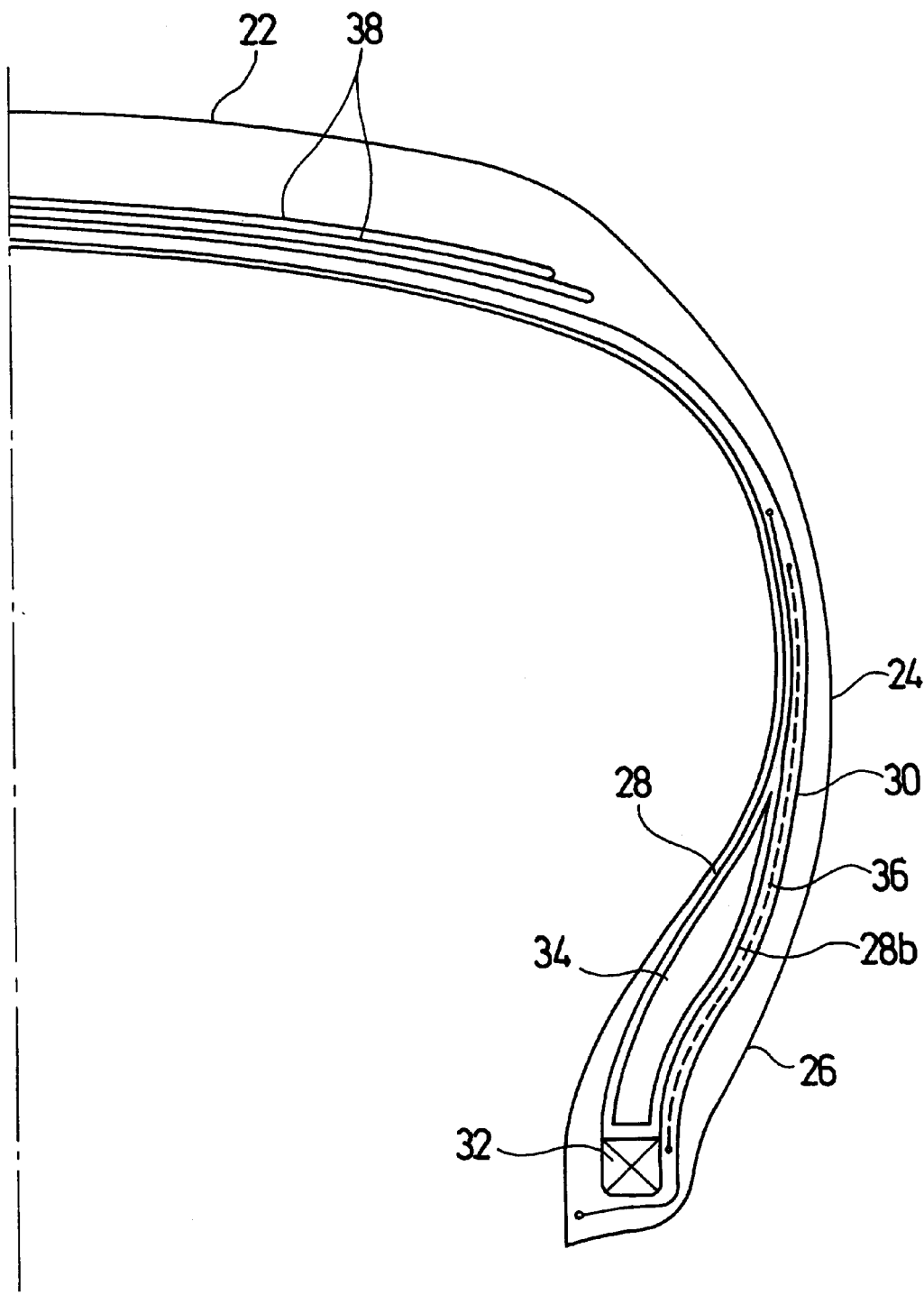
FIG. 2 is a semi-sectional view in a meridian direction showing an example of a conventional pneumatic tire.

| Tire structure | Ply No. | Cord fiber size | Layer No. fiber size (total denier) | Driving stability | JIS load durability |
| --- | --- | --- | --- | --- | --- |
| Conventional tire | FIG. 2 | 2 | 1500 D/2 | 3000 D | 100 | 100 |
| Invented tire | FIG. 1 | 3 | 1000 D/2 | 3000 D | 140 | 150 |

[0025] As is apparent from Table 1, it has been shown that the invented tire is improved over the conventional tire in both driving stability and load durability.

[0026] As has been described in detail, the pneumatic radial tire according to the invention has three carcass layers, each comprising organic fiber cords. Both end portions of the first and the second carcass layers are folded back from the inner side to the outer side of the tire around the bead cores. The reinforcement layers are arranged on the outer sides of the fold back portions. The third carcass layer is turned down to cover the reinforcement layers on the outer sides of the reinforcement layers. Consequently, in comparison with the conventional tire for a high performance passenger vehicle, driving stability and load durability are improved without substantially increasing the mass of the tire. Driving stability and load durability are obtained applicable also to high performance passenger vehicles which have been on sale in recent years.

What is claimed is:

1. A pneumatic radial tire comprising three carcass layers including a first carcass layer, a second carcass layer and a third carcass layer enumerated from an inner side to an outer side of the tire, each carcass layer comprising organic fiber cords and having respective cord angles relative to a peripheral direction of the tire in a range of 65 degrees through 90 degrees;

wherein end portions of the first carcass layer and the second carcass layer are folded back from the inner side to the outer side of the tire respectively around bead cores to form first and second fold back portions, reinforcement layers are arranged on outer sides of the fold back portions of the first and second carcass layers and the third carcass layer is turned down to cover axially outer sides of the reinforcement layers.

2. The pneumatic radial tire according to claim 1, wherein the second fold back portion is longer than the first fold back portion.

3. The pneumatic radial tire according to claim 1, wherein a distal end of the first fold back portion is arranged to a side of a bead portion less than a maximum sectional width position of the tire and a distal end of the second fold back portion is arranged on a side of a tread more than the maximum sectional width position of the tire.

4. The pneumatic radial tire according to claim 1, wherein the reinforcement layer comprises steel cords or aramid fiber cords.

\* \* \* \* \*